United States Patent
Vargas

(10) Patent No.: US 7,204,362 B2
(45) Date of Patent: Apr. 17, 2007

(54) AUTOMATIC TRAY REPOSITIONING DEVICE

(75) Inventor: Luis Vargas, Sun Valley, CA (US)

(73) Assignee: National Conveyor Corporation, Commerce, CA (US)

(*) Notice: Subject to any disclaimer, the term of this patent is extended or adjusted under 35 U.S.C. 154(b) by 282 days.

(21) Appl. No.: 11/021,827

(22) Filed: Dec. 23, 2004

(65) Prior Publication Data

US 2005/0139587 A1 Jun. 30, 2005

Related U.S. Application Data

(60) Provisional application No. 60/549,764, filed on Mar. 3, 2004, provisional application No. 60/533,334, filed on Dec. 30, 2003.

(51) Int. Cl.
*B65G 43/08* (2006.01)

(52) U.S. Cl. ............... 198/401; 198/416; 198/395

(58) Field of Classification Search ............. 198/394, 198/395, 401, 416, 412
See application file for complete search history.

(56) References Cited

U.S. PATENT DOCUMENTS

| | | | |
|---|---|---|---|
| 3,216,547 A * | 11/1965 | De Good et al. ............ 193/32 |
| 3,522,872 A * | 8/1970 | Holloway et al. .......... 198/416 |
| 3,584,752 A | 6/1971 | Ettlinger et al. | |
| 3,990,571 A | 11/1976 | Kitterman et al. | |
| 4,002,231 A | 1/1977 | Doty | |
| 4,497,400 A | 2/1985 | Otto et al. | |
| 4,895,244 A | 1/1990 | Flaugher et al. | |
| 5,302,079 A | 4/1994 | Cestonaro et al. | |
| 5,755,437 A | 5/1998 | Ed | |
| 6,290,053 B1 * | 9/2001 | Caporali et al. ............ 198/411 |
| 6,581,929 B2 | 6/2003 | Hiramitsu | |
| 2004/0134753 A1 * | 7/2004 | Diego et al. ............... 198/395 |

* cited by examiner

*Primary Examiner*—James R. Bidwell
(74) *Attorney, Agent, or Firm*—Morrison & Foerster LLP

(57) ABSTRACT

An automatic tray repositioning device for automatically repositioning a tray that has been misaligned onto a rotating shelf. The invention includes a placement arm set partially within a housing, the arm connected to a vertically mounted motor. The motor is in communication with a detection system, such that when a portion of a tray is detected, the motor acts to immediately move the placement arm toward the tray, to gently reposition the tray back onto the shelf on which it sits.

4 Claims, 12 Drawing Sheets

AUTOMATIC TRAY REPOSITIONING DEVICE

CROSS-REFERENCE TO RELATED APPLICATIONS

This application claims priority to U.S. provisional application Ser. No. 60/533,334 entitled "Automatic Tray Repositioning Device," filed Dec. 30, 2003, and U.S. provisional application Ser. No. 60/549,764 entitled "Automatic Repositioning of Trays," filed Mar. 3, 2004, the contents of which both are incorporated herein by reference for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

In most cafeteria settings, there is a large window providing access to the dish room from the dining area. Positioned in this window are shelves where finished trays are set. The shelves are designed to carry the trays to the dish room. In most instances, the shelves are arranged on a conveyor comprised of a series of rotating carriers fastened to a concealed chain. Each carrier has tiers of individually removable shelves. Generally, the carriers and shelves are made of stainless steel. The side of the window-accessible to the customer/diner is designated the "drop-off" side, the opposite side of the window being inside the dish room. On the drop-off side, the customer places the used cafeteria tray onto a shelf, and on the dish room side, an operator removes the tray for cleaning.

Often, a customer will improperly load the tray onto a shelf, such that the front side of the tray extends beyond the allotted overhang (usually approximately 3 inches) of the shelf. In such a circumstance, the tray will contact the window frame, which may lead to equipment damage and, in some instances, injury to the customer. To prevent this problem from occurring, it is standard to utilize a safety mechanism adjacent the window frame side that the shelves move toward, as shown in FIGS. 1–3 and 7. The safety system usually comprises a photoelectric limit switch positioned at the top of the window in alignment with a reflector positioned at the bottom of the window. This simple detection system stops movement of the rotating shelves when a tray has been incorrectly placed thereon so that the tray does not collide with the window frame and fall off of the shelf or cause other trays to fall off of the shelves. Once the shelves have ceased movement, an operator must manually reposition the offending tray onto the shelf on which it sits.

While such a safety feature can prevent certain problems from occurring, it can be quite time consuming for an operator to leave the dish room every time a tray is misaligned on a shelf, which may lead to severe back-ups in the cleaning process, particularly at peak hours. Thus, it would be desirable to provide a device that would reposition a misaligned tray onto a shelf automatically to avoid intermittent system shut down and manual repositioning by an operator.

BRIEF SUMMARY OF THE INVENTION

Accordingly, an automatic tray repositioning device is described herein, which rapidly repositions a cafeteria tray onto a rotating shelf so that the tray will not cause any damage to equipment, injury to customers will be averted and the tray cleaning process will be expedited in that manual repositioning by an operator inside the dish room will no longer be required. The tray repositioning device may be comprised of a vertically mounted rotary motor, a photo-eye limit switch and reflector, a jointed arm and a safety cover.

DETAILED DESCRIPTION OF THE INVENTION

The following detailed description should be read with reference to the drawings, in which like elements in different drawings are identically numbered. The drawings, which are not necessarily to scale, depict selected preferred embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

Figure 4:
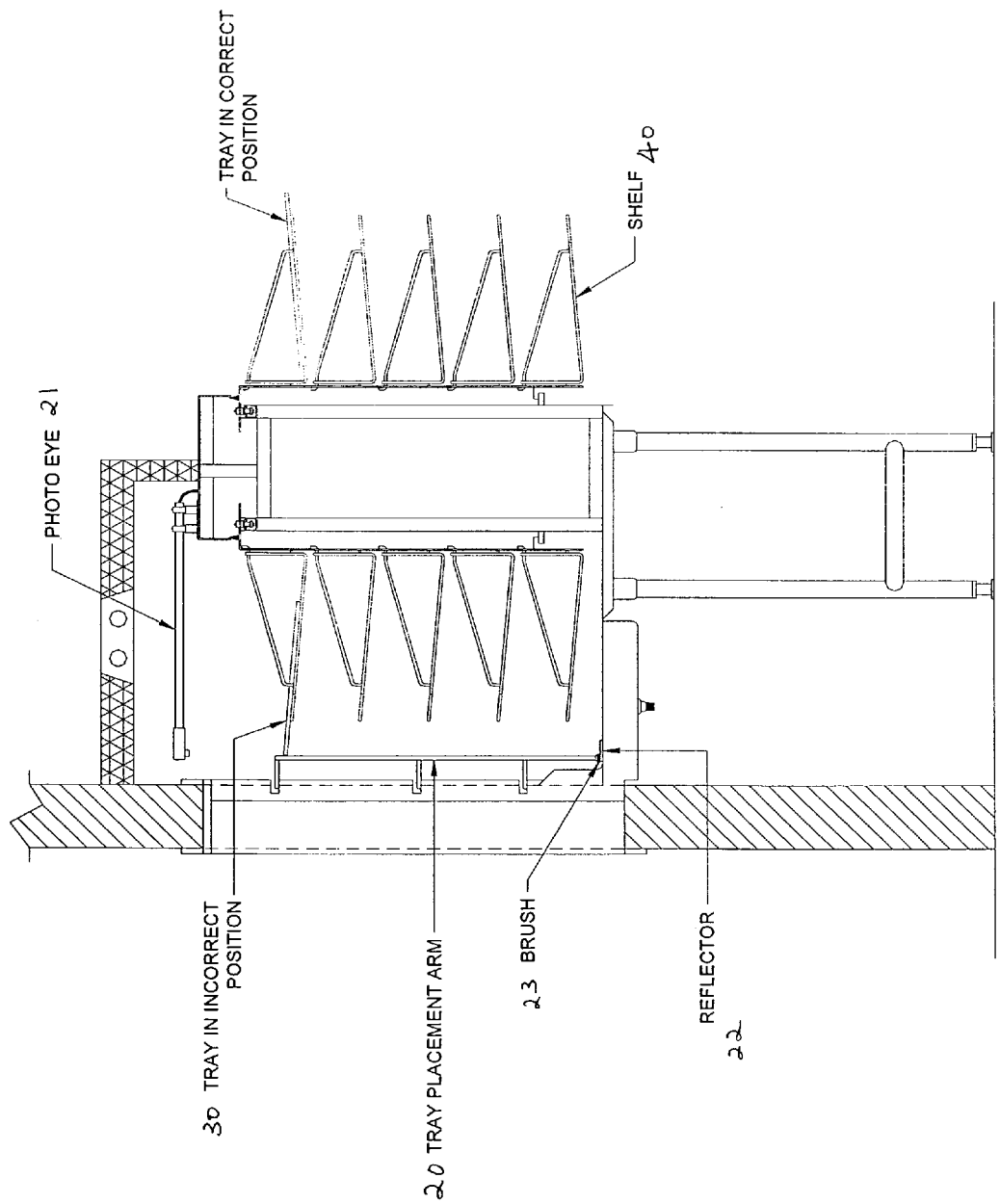
FIG. 4 is a cross-sectional side view of the present invention.
Figure 5:
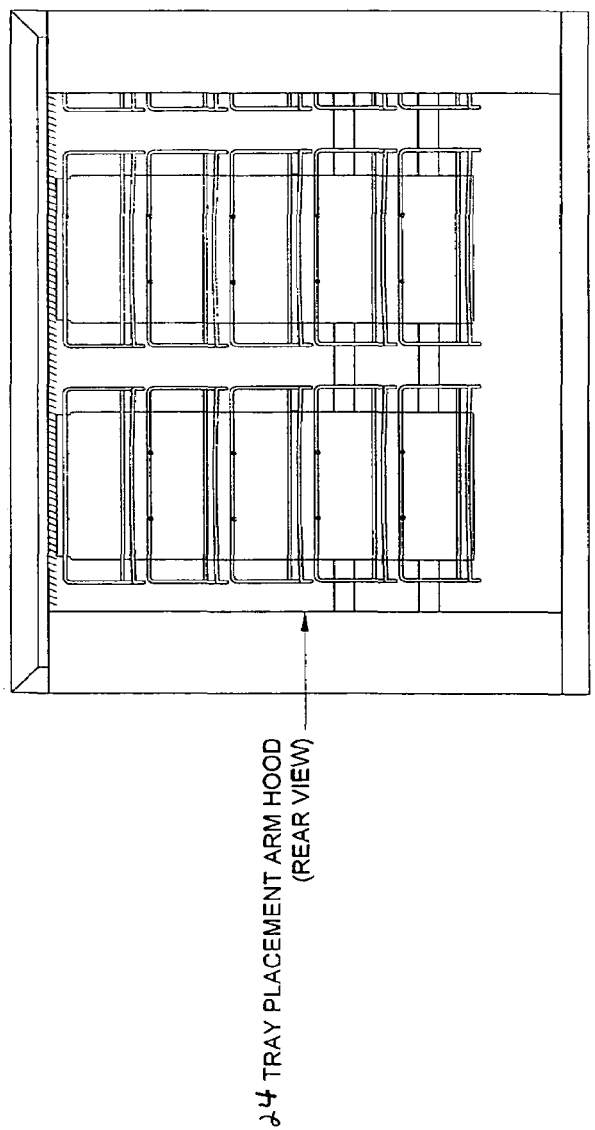
FIG. 5 is a front view of the present invention.
Figure 6:
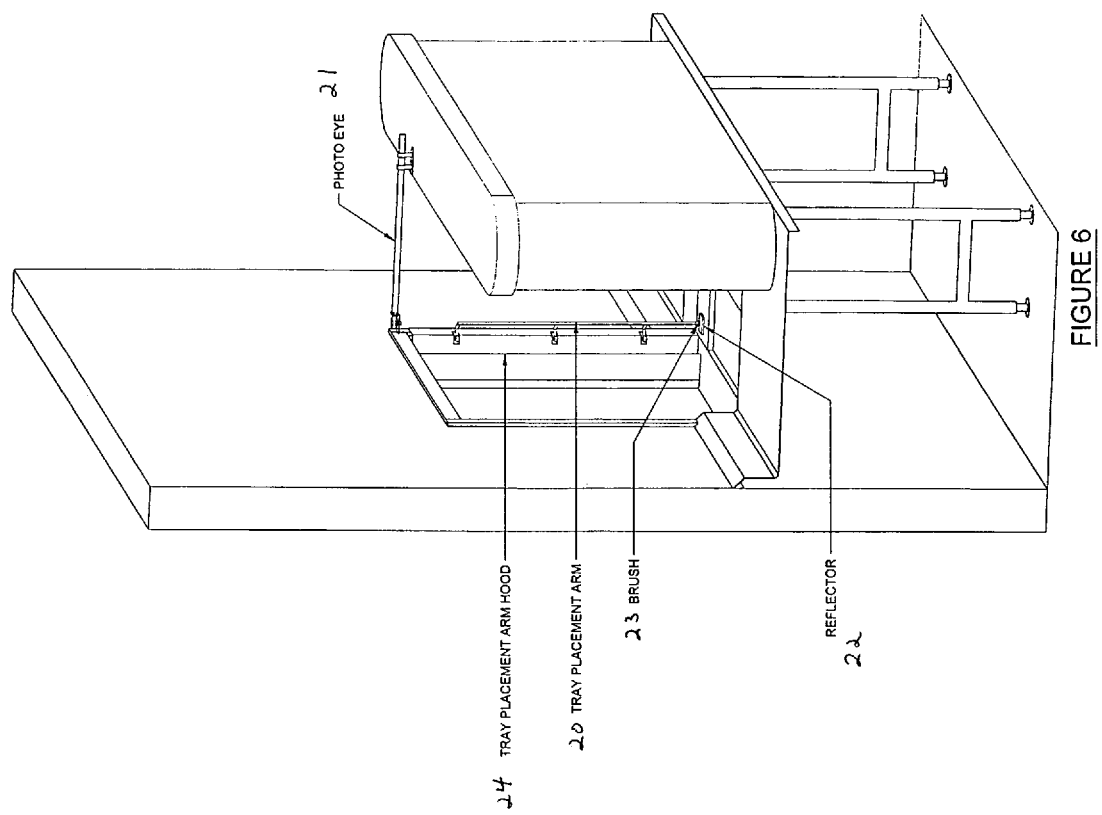
FIG. 6 is a perspective view of the present invention.
Figure 7:
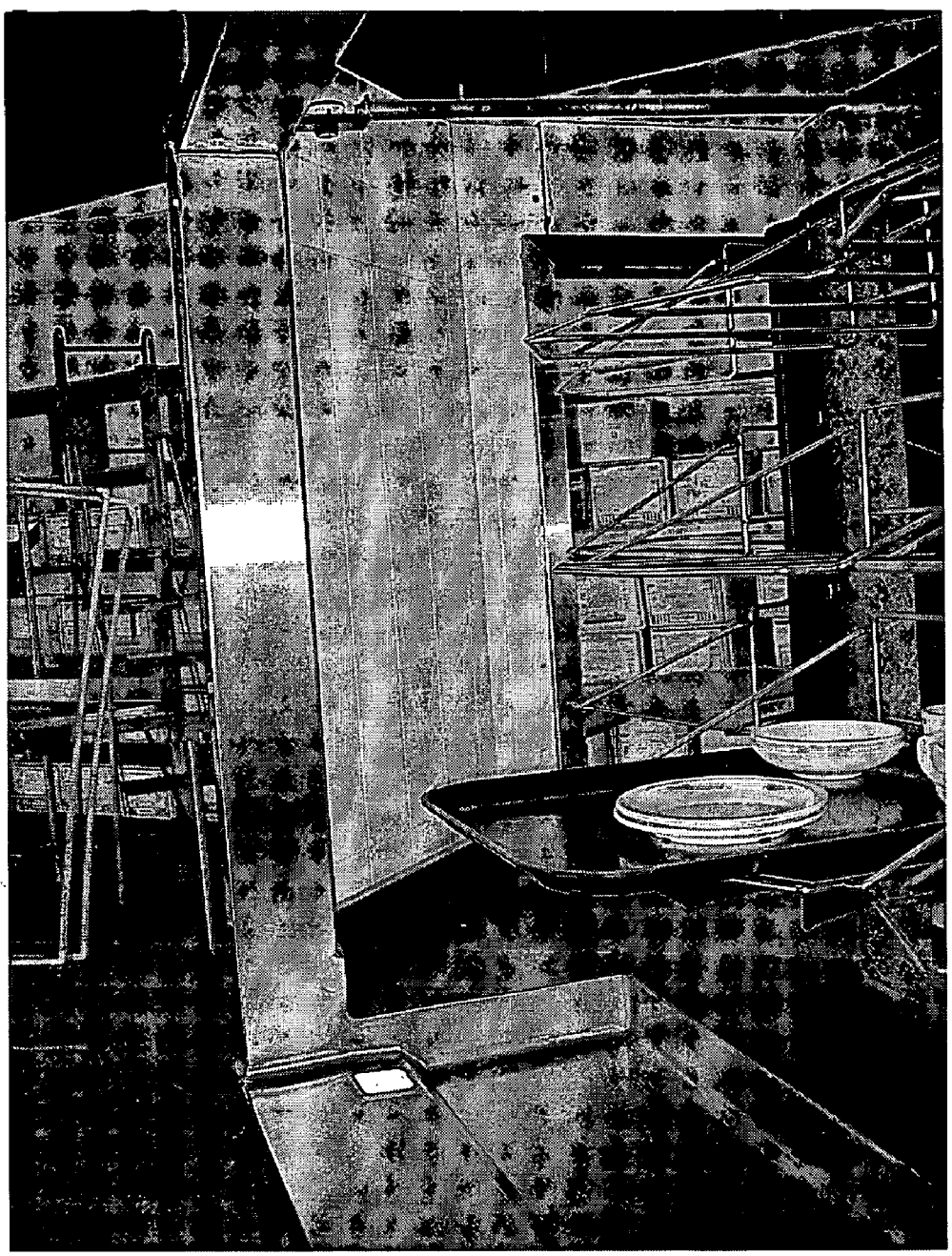
FIG. 7 is a photograph of the prior art system, showing the photo-eye and reflector adjacent the window frame side that the shelves move toward.
Figure 8:
FIG. 8 is a photograph of a prototype of the present invention, taken from the same angle as that in FIG. 7, showing aspects of the device.
Figure 9:
FIG. 9 is a photograph of a prototype of the present invention, showing a misaligned tray on a shelf.
Figure 10:
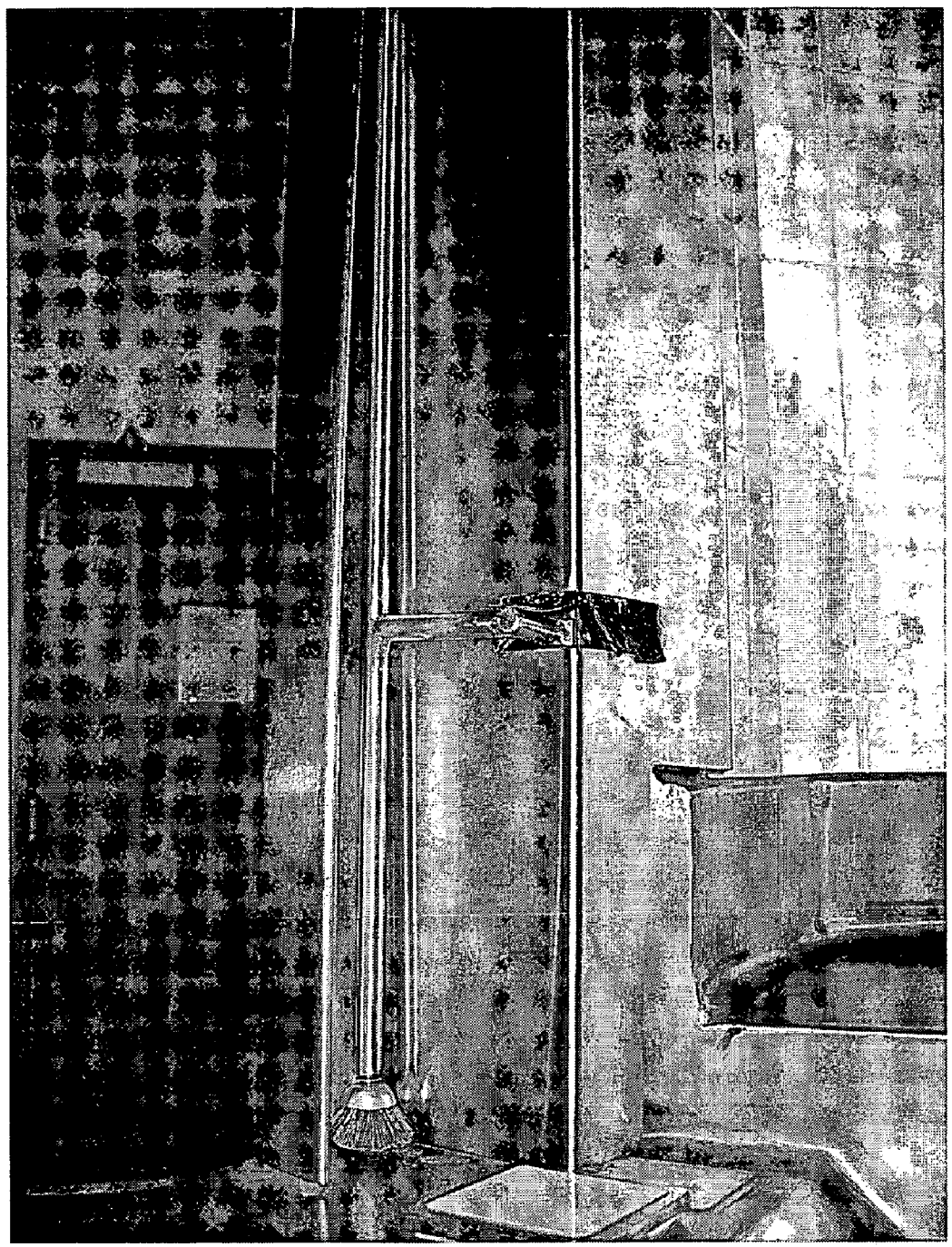
FIG. 10 is a close-up photograph of a prototype of the present invention, showing the base of the jointed arm.
Figure 11:
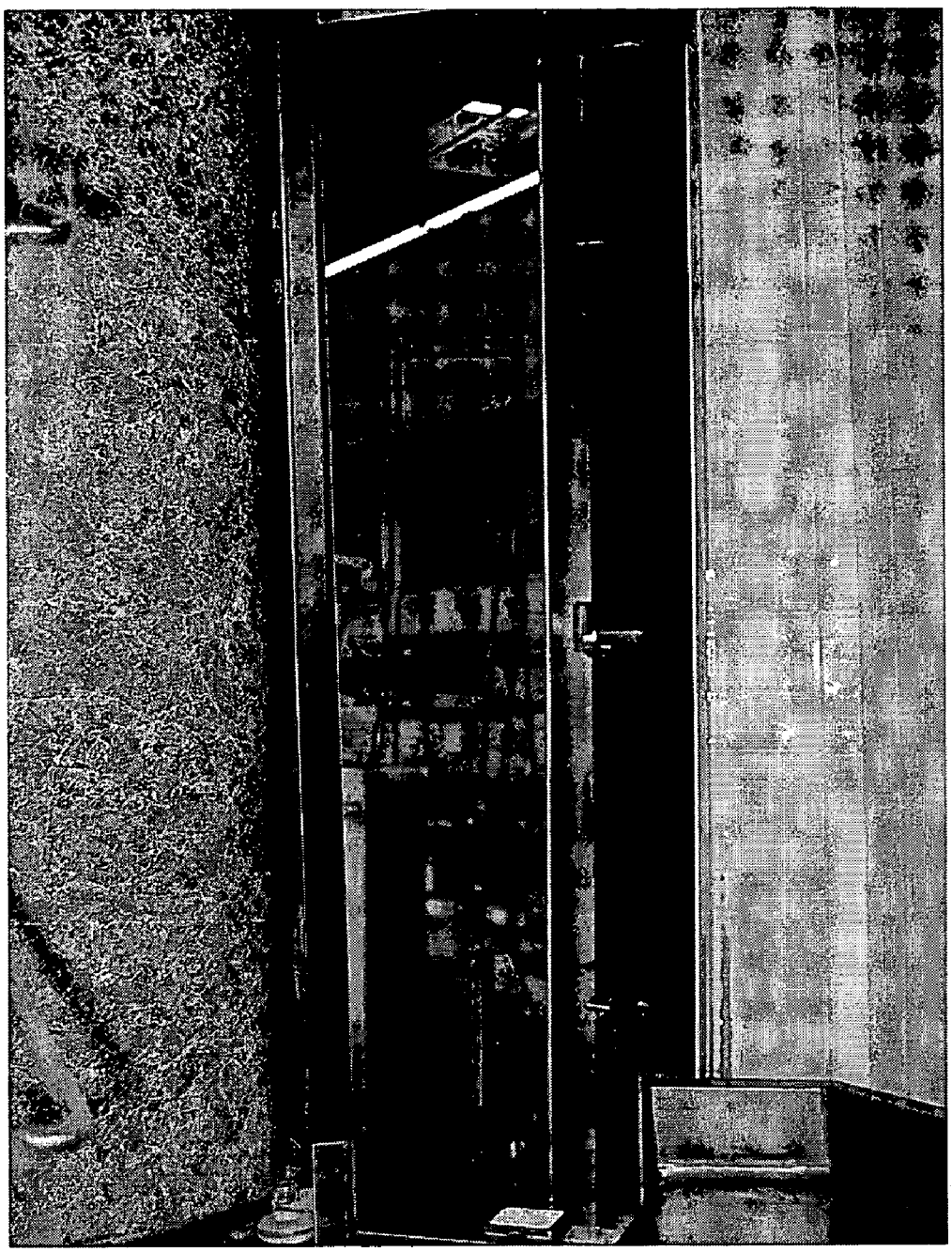
FIG. 11 is a photograph of a prototype of the present invention, taken from inside the dish room.
Figure 12:
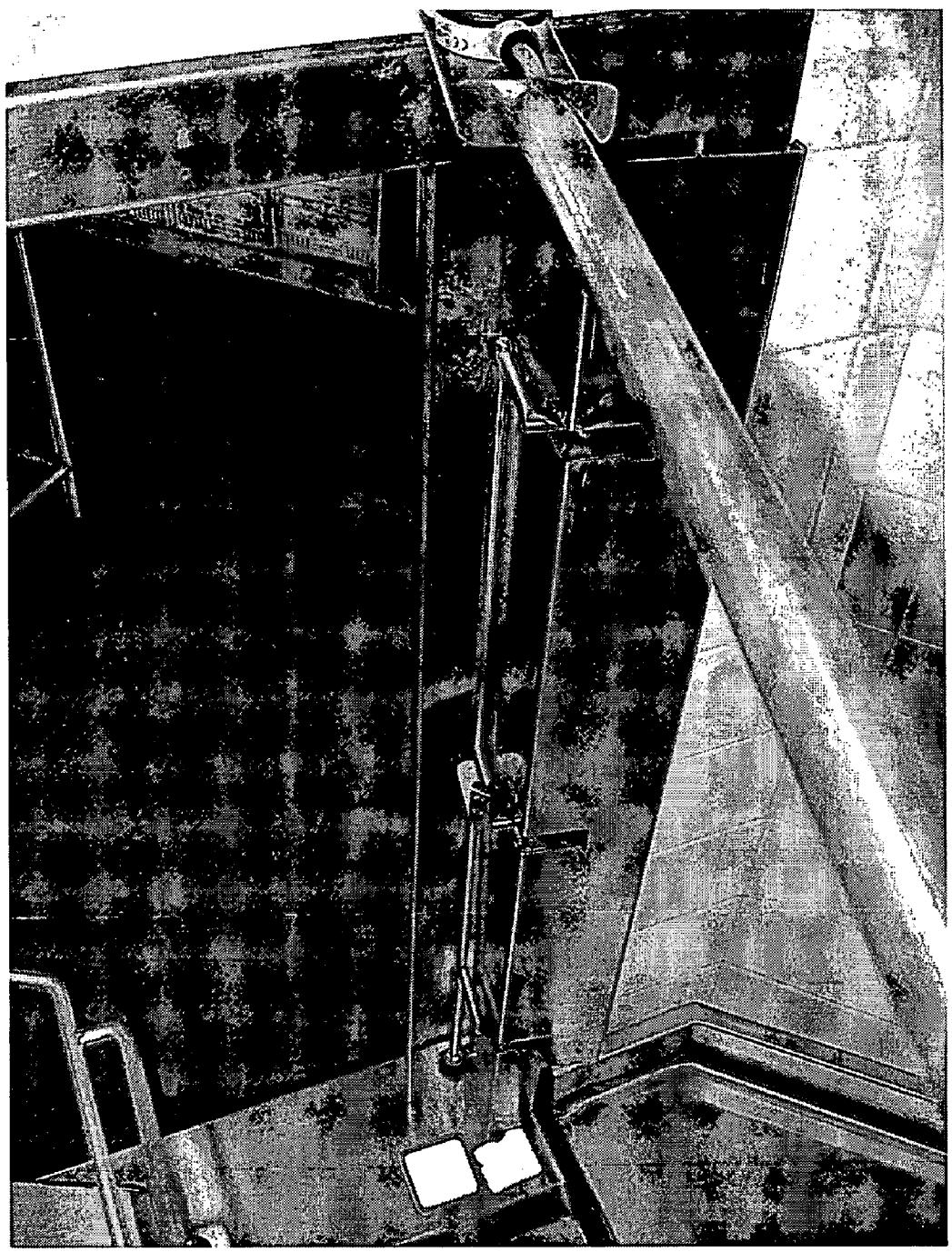
FIG. 12 is a photograph of a prototype of the present invention, taken from an overhead angle.

The present invention provides an improvement to a safety feature present in most cafeterias. More specifically, the present invention is directed to a tray repositioning device for automatically repositioning a tray that has been misaligned onto a rotating shelf. The invention comprises a placement arm set partially within a housing, the arm connected to a low-voltage vertically mounted motor. The motor is in communication with a detection system, comprising a photo-eye limit switch such that when a portion of a tray is detected, the motor acts to immediately move the placement arm toward the tray, to gently reposition the tray back onto the shelf on which it sits. The invention further comprises a protective hood positioned on the drop-off side of a cafeteria window, to shield the placement arm from the customer as he deposits his tray onto a shelf. These and other features are more clearly seen in connection with FIGS. 4–6 and 8–12. FIGS. 4–6 are illustrations of a tray repositioning device according to the present invention, while FIGS. 8–12 are photographs taken of a prototype of the tray repositioning device of the present invention.

Figure 1:
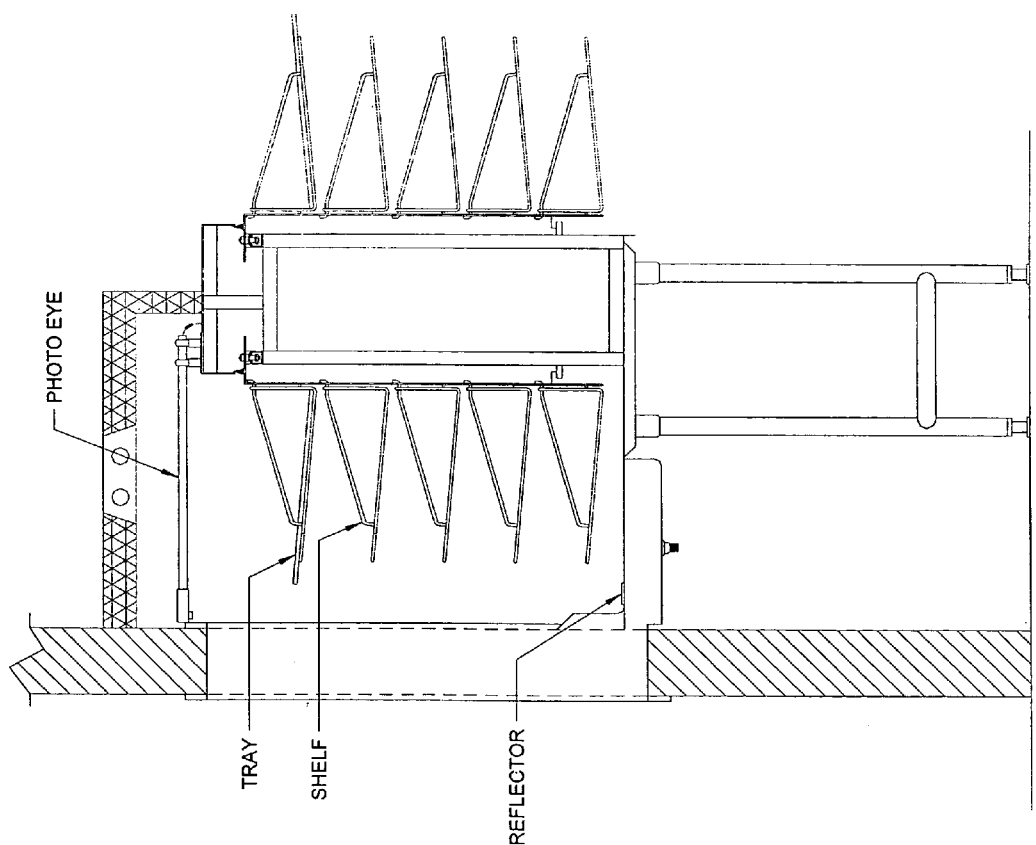
FIG. 1 is a cross-sectional side view of a prior art system.
Figure 2:
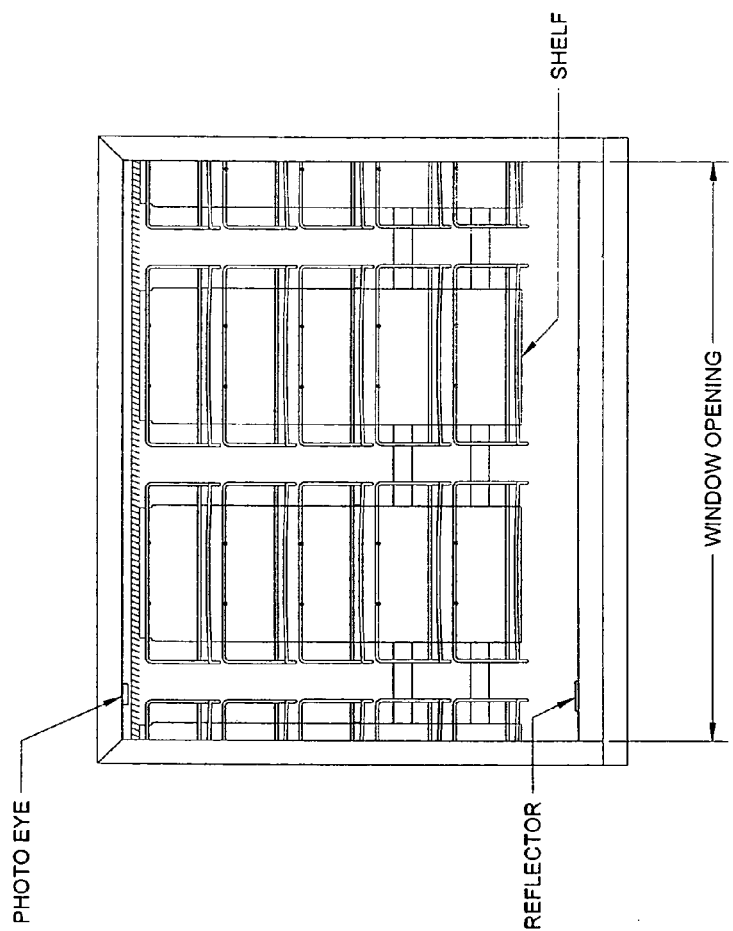
FIG. 2 is a front view of the prior art system of FIG. 1.
Figure 3:
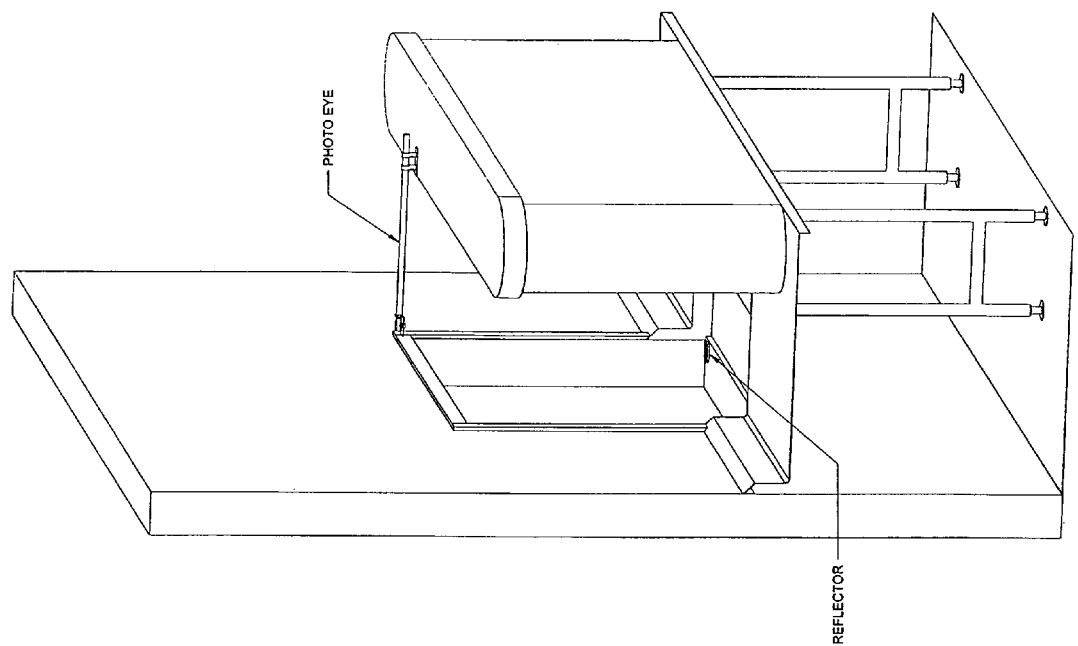
FIG. 3 is a perspective view of the prior art system of FIG. 1.

More particularly, FIG. 4 illustrates how the tray repositioning device of the present invention interacts with a misaligned tray to reposition the tray. In one embodiment, the action of the placement arm 20 into and out of the detection zone created by the photo-eye 21 and reflector 22 is fast enough to prevent system shut down. In said embodiment, the placement arm 20 contacts the misaligned tray 30 to push the tray onto the shelf 40 so that no portion thereof extends into the detection zone and does so before any signal from the detection system to the conveyor can be sent, as the signal would shut the conveyor down for manual repositioning of the offending tray. Attached to the bottom of the placement arm 20 is a circular brush 23, which is designed to wipe off foreign objects from the reflector 22 to prevent such objects from activating the photo-eye and consequently causing system shut down. FIG. 5 illustrates the present invention from the drop-off side of the window (i.e., a rear view of the tray repositioning device), showing the decrease in the width of the window due to the presence of the repositioning device when compared to FIG. 2. FIG. 6 illustrates the present invention from a perspective view to show the components thereof. FIGS. 8–12 are photographs of an actual reduction to practice of the present invention.

The present invention has been described above in terms of certain preferred embodiments so that an understanding of the present invention can be conveyed. However, there are many alternative arrangements not specifically described herein, but with which the present invention is applicable. Although specific features have been provided, the present invention would equally be embodied by other configurations not specifically recited herein. The scope of the present invention should therefore not be limited by the embodiments illustrated, but rather it should be understood that the present invention has wide applicability with respect to catheter systems generally. All modifications, variations, or equivalent elements and implementations that are within the scope of the appended claims should therefore be considered within the scope of the invention.

What is claimed as new and desired to be protected by Letters Patent of the United States is:

1. An automatic tray repositioning device for repositioning a tray that has been misaligned onto a shelf, comprising a detection system and a placement arm coupled to said detection system, such that activation of the detection system by a portion of a tray passing into a detection zone causes said placement arm to move toward said tray and contact said tray to move said tray out of said detection zone.

2. The automatic tray repositioning device according to claim 1, further comprising a vertically mounted motor coupled to said placement arm.

3. The automatic tray repositioning device according to claim 1, further comprising a hood to shield said placement arm.

4. The automatic tray repositioning device according to claim 1, wherein said detection system comprises a photo-eye and a reflector, and wherein said detection zone comprises a beam created by said photo-eye and reflector.

* * * * *